(12) United States Patent
Sala

(10) Patent No.: US 6,435,333 B1
(45) Date of Patent: Aug. 20, 2002

(54) ADJUSTABLE UNIT FOR THE UNSCRAMBLING AND LINED UP DELIVERY OF EMPTY CONTAINERS

(76) Inventor: Jaime Marti Sala, c/ Emancipacio 8, 08017 Barcelona (ES)

( * ) Notice: Subject to any disclaimer, the term of this patent is extended or adjusted under 35 U.S.C. 154(b) by 0 days.

(21) Appl. No.: 09/489,661

(22) Filed: Jan. 21, 2000

Related U.S. Application Data

(63) Continuation-in-part of application No. PCT/ES98/00143, filed on May 21, 1998.

(51) Int. Cl.$^7$ ............................................... B65G 17/32
(52) U.S. Cl. ...................... 198/384; 198/383; 198/382; 198/400
(58) Field of Search ................................ 198/384, 383, 198/382, 400

(56) References Cited

U.S. PATENT DOCUMENTS

| | | | |
|---|---|---|---|
| 3,791,553 A | | 2/1974 | Aidlin et al. ................ 221/156 |
| 5,117,963 A | * | 6/1992 | Thayer et al. ............... 198/395 |
| 5,415,322 A | | 5/1995 | Sala ........................... 221/169 |
| 5,499,708 A | * | 3/1996 | Gorecki et al. ............. 198/400 |
| 5,549,189 A | * | 8/1996 | Marti Sala .................. 198/380 |
| 5,735,382 A | * | 4/1998 | Jung ........................... 198/399 |
| 5,927,468 A | * | 7/1999 | Corniani et al. ............. 198/394 |
| 6,098,781 A | * | 8/2000 | Lanframchi ................. 198/400 |
| 6,116,406 A | * | 9/2000 | Marti Sala .................. 198/395 |

* cited by examiner

Primary Examiner—Christopher P. Ellis
Assistant Examiner—Rashmi Sharma
(74) Attorney, Agent, or Firm—Richardson & Folise

(57) ABSTRACT

An adjustable unit for the unscrambling and lined up delivery of empty containers (A) has a plurality of compartments (6) connected to a first rotary structure (7) to receive containers (A) in a lying position. The compartments (6) have an open bottom delimited by arrangements (11 and 12) for supporting the open end (A1) of the container (A) in the vicinity of the leading and trailing sides. A plurality of discharge chutes (8) associated with each structure (7) below each compartment (6) receives the containers (A) as they fall, and to thus transfer them in an upright position and in a lined up arrangement onto another equipment. A supporting stationary floor (9) is interposed between the compartments (6) and said chutes (8), with a discharge gap (10) for supporting the open end (A1) of the container (A) in the vicinity of said leading side of the compartment (6).

24 Claims, 2 Drawing Sheets

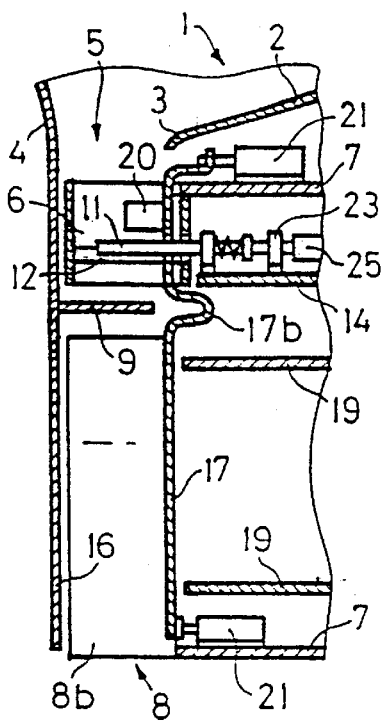
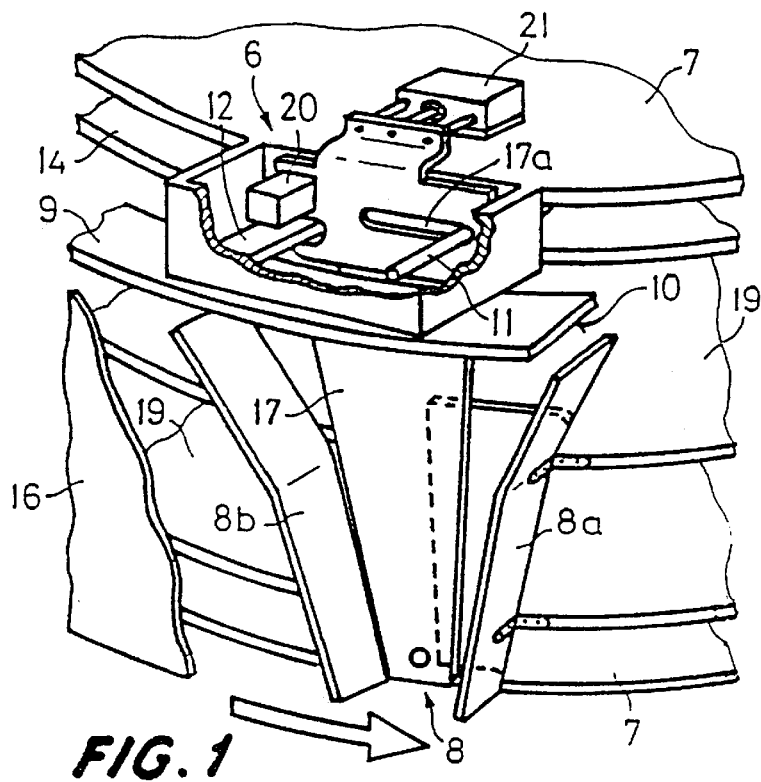
FIG. 2
FIG. 1
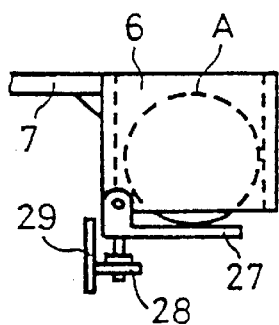
FIG. 3
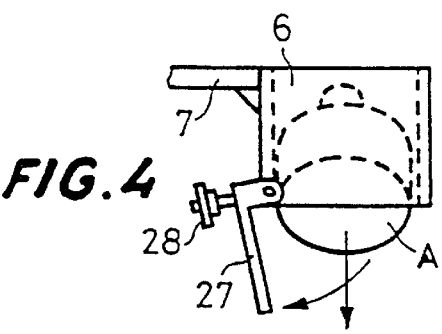
FIG. 4
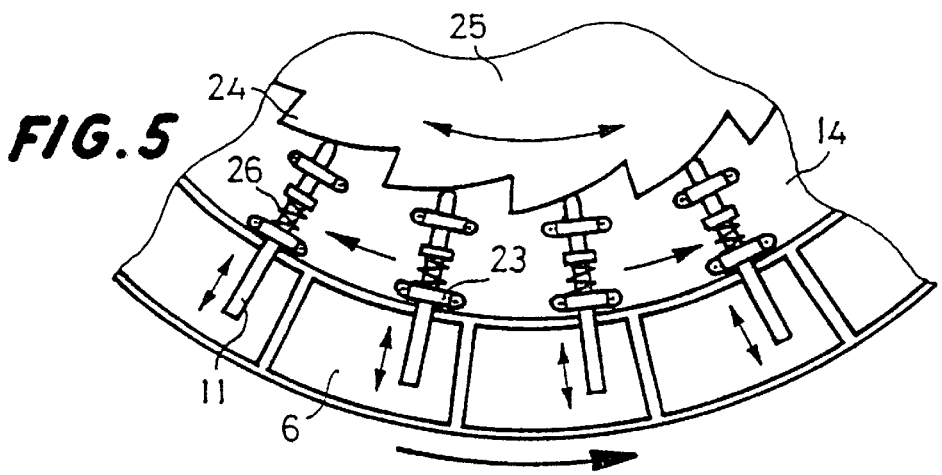
FIG. 5

ADJUSTABLE UNIT FOR THE UNSCRAMBLING AND LINED UP DELIVERY OF EMPTY CONTAINERS

This application is a continuation-in-part of PCT/SE98/00143 filed May 21, 1998.

The present invention concerns an adjustable unit for the unscrambling and lined up delivery of empty containers which is specially provided for feeding lightweight containers into filling lines.

The function of this type of units is that of taking containers from a location where said containers are grouped and randomly oriented in a scrambled arrangement, to thereupon deliver them one by one and oriented in an upright position (i.e. with their base resting on the floor and with their neck upwards) onto another given location such as for example onto a conveyor or a filling line.

Several units are known in the prior art comprising means to take container from a location where said containers are piled up in a scrambled arrangement and to individually deposit them in a lying position into a plurality of bottomless cavities or receptacles situated on a structure traveling along a closed circuit above a supporting stationary floor. The containers are in this way driven by the receptacle walls or cavity sides, and are slidingly supported by the stationary floor. At a discharge location said stationary floor has a gap through which said containers are transferred by gravity from said receptacles or cavities into discharge chutes. There is one discharge chute associated to each of the receptacles, and each of the receptacles has means to support the neck of the container regardless of the orientation of the container inside the receptacle, in such a way that when the container falls it always does so with its base first, this resulting in the upright positioning of the container with its neck oriented upwards.

European Patent EP-A-0 065 866 discloses a unit of this type with a rotary disk provided with peripheral openings defining container receiving cavities delimited by radial appendages. In this unit, said means to support the neck of the container regardless of its orientation inside the peripheral cavities consist in supports defined on said two appendages, situated one at each end of the corresponding cavity delimited by them, designed with a specific configuration as per their traveling direction and the length of the container, since due to the inertial and frictional forces the container does always tend to rest against the trailing wall of the receptacle as per the traveling direction. The appendage corresponding to the leading wall in the traveling direction does therefore comprise a simple support for the neck of the container whereas the appendage corresponding to the trailing wall integrates in addition to a support for the neck a stop arrangement for the base or bottom of said container in order to thus prevent said base from coming to rest on said support. With this arrangement, if the container is received in the cavity with the neck oriented towards the trailing side said container, due to the effect of the traveling motion, will rest against said trailing side, with its neck situated on the corresponding support whereas the base of the container will be freely supported and will thus slidingly travel on the stationary floor, since the support provided at the leading wall is situated at a predetermined distance as per the length of the container in order not to interfere with its base. If the container is received into the receptacle with the neck oriented towards the leading side the base of said container, due to the effect of the traveling motion, will rest against the stop arrangement of the trailing appendage, and not on the trailing support, thereby being supported by gravity and slidingly traveling on the stationary floor whereas the neck of the container, due to the stop of the trailing appendage, will be situated on the corresponding support of the appendage of the leading side. With this arrangement both in one and in the other case when arriving at the gap provided in the supporting stationary floor the container finding itself in the receptacle will always fall into the corresponding discharge chute with its bottom or base first.

In spite of being effective, this arrangement has the drawback that it requires a precise width of the receptacle and a very accurate positioning of said leading and trailing appendages within said receptacle, according to the shape and dimensions of each type of container. This means that in order to adapt a unit such as the one disclosed in the above-mentioned European Patent EP-A-0 065 866 to a different type of container it is necessary to carry out a manual adjustment of the position of said appendages one by one in a labor-intensive, difficult and time-consuming operation entailing a high financial cost.

U.S. Pat. No. 4,681,209 to the same applicant of this invention discloses a unit of this type comprising radial parts having on one side a leading appendage and on another side a trailing appendage, the cavities being formed between two of said parts, these latter being apt to be fixed in a plug-in connection to the moving structure of the unit, and being thus replaceable in an extraordinarily easy and quick way. Also in said unit the discharge chutes are provided with quick fastening means, and are also therefore easily replaceable.

This arrangement allows to better adapt the unit to the dimensions of different types of containers in a quick operation, but it has the drawback of not allowing a transversal adjustment of the cavities, and of besides requiring to keep in stock a set of radial parts and discharge chutes adapted to each type of container, with the consequent financial cost to be incurred because of this, besides the problem of the storage space required.

The French Patent Application FR-A-91 12 375 by this same applicant discloses an unscrambling unit of this type with peripheral cavities delimited by radial appendages wherein all of the leading appendages of the compartments are fixed to a first structure whereas all of the trailing appendages are fixed to a second structure, this second structure being relatively shiftable with respect to the first one, in such a way that by adjusting the longitudinal distance between the leading and trailing appendages in a compartment an identical spacing is obtained in all of the remaining compartments. Said French Patent Application FR-A-91 12 375 adopts a similar solution for the discharge chutes.

This solution represents a substantial improvement with respect to Patent EP-A-065866, but it doesn't still provide a solution to the problem of the adjustment of the transversal width both of the compartments and the discharge chutes. The adjacent radial parts are besides connected in said patent by parts provided by way of bellows, so that if the cavity has its length reduced a wide circumferential area is rendered inoperative. Another drawback that is common to all units disclosed in the patents cited so far is the one consisting in the nonexistence of an outer wall at the cavities, the containers hence traveling in sliding contact with a stationary outer wall forming a shell, and being impelled against it by the centrifugal force when traveling along a circumferential path.

Patent Application EP-0 578 602-B1 by the same applicant of the present invention discloses on its side a unit of this type wherein the cavities are formed by a series of individual compartments similarly to the discharge chutes, both the compartments and the chutes being apt to be fixed in a plug-in connection to the periphery of said rotary structure, such that both the compartments and the discharge chutes are very easily and quickly replaceable with no need of tools, a set both of compartments and discharge chutes being available for each type of container.

The solution of the replacement of the compartments and discharge chutes has the advantage of providing, in a quick and easy operation, an optimal adaptation to each type of container in the three dimensions in space, the outer wall of each compartment preventing besides the containers from being in frictional contact against the stationary outer wall as they travel. Nevertheless, this system again requires a manufacturing and storage of one set of said compartments and/or discharge chutes for each different type of container, this then entailing a consequent financial cost.

Everything stated above allows to conclude that there is a need, in this industrial sector of the handling of lightweight containers, of a unit for the unscrambling and lined up delivery of empty containers having means to adapt said unit to different types of containers both in the longitudinal and transversal directions in such a way that said adaptation is carried out by means of a quick and economical operation and without requiring a space availability for the storage of replacement parts.

An object of the present invention is hence to provide a unit of the type discussed above provided with compartments with means allowing to adjust both the width and the longitudinal and transversal positions of the support for the neck of the container at the leading side of the compartments with no need to replace any parts.

Another object of the invention is that of providing a unit of the above type provided with means to adjust the discharge chutes both in the longitudinal and transversal directions with no need to replace them.

Yet another object of the present invention is that of providing a unit of the above type wherein each of said adjustments is simultaneously carried out in all of the compartments whether when manually acting on a given single compartment or through mechanical means both automated or not.

Another additional object of the present invention is that of providing a unit of the above type wherein adjustable compartments can be combined with replaceable discharge chutes.

These objects are achieved in a unit as per the invention by means of arranging all of the compartments on a first structure that is apt to carry out a traveling motion along a closed circuit. Each of the compartments is provided, in an area in the vicinity of its leading wall, with a transversal, elongated member such as a bar or rod forming the leading support for the neck of the container and being apt to be longitudinally and transversally shifted within said compartment, and with one of the walls being fitted in such a way that it can be transversally shifted within said compartment. Both said elongated member and said shiftable wall can be fixed in a desired position thus providing an adaptation of said compartment to the height and width of a given container.

All and each of said elongated rods or bars are associated to a second structure that is relatively shiftable with respect to the first one and can be fixed in a desired position thus providing with simultaneity an identical transversal positioning of the elongated members in all of the compartments.

The transversal position of all and each of the elongated members and/or of all and each of the shiftable lateral walls can on its side be jointly and simultaneously adjusted and fixed by means of, for example, a manually actuated cam device or by any other mechanical, pneumatic or hydraulic means.

The discharge chutes are formed by a leading wall, a lateral wall and a trailing wall, with an open side that is delimited by the wall of a stationary shell. All and each of the trailing walls of said discharge chutes are connected to said first structure whereas all and each of the leading walls are connected to a third structure that is shiftable with respect to the first one, whereby the relative position between both the first and third structures can be fixed in a desired position thereby providing a simultaneous adaptation of all the discharge chutes to the width of a given type of container. Each shiftable lateral wall of said discharge chutes is on its side apt to be transversally shifted thereby allowing to adjust and fix in a desired position its relative position with respect to the stationary wall of the shell. By means of a manually actuated cam system or by pneumatic or hydraulic means said adjustment is carried out in a joint and simultaneous manner in all discharge chutes for their adaptation to the width of a given type of container.

In one of the exemplary embodiments of a unit as per the invention each of the shiftable lateral walls of the compartments and each of the shiftable lateral walls of the corresponding discharge chutes are jointly formed by one only part apt to be shifted in a transversal direction, all and each of said parts being apt to be shifted to and fixed in a desired position in a joint and simultaneous manner thereby providing in one only operation an adaptation of all of the compartments and all of the discharge chutes to the width of a given type of container.

For a better understanding of the invention there follows below a detailed description of it with reference to the enclosed drawings whose purpose is to merely illustrate exemplary embodiments of the present invention, and which therefore shall not be deemed to in any way limit the scope of said invention. In said drawings:

FIG. 1 is a perspective partial view for better clarity showing only one compartment with its corresponding appendages and one discharge chute together with the assembly of supporting structures;

FIG. 2 is a cross-sectional diagrammed view of the compartment and discharge chute of FIG. 1;

FIGS. 3 and 4 are cross-sections corresponding to an exemplary embodiment wherein the supporting floor is not stationary, but is formed by a movable floor associated to each compartment;

FIG. 5 is a plan-view of a possible manually actuated cam system for the joint and simultaneous adjustment of the transversal shift of all of the longated members for supporting the neck of the container;

Figure 10:
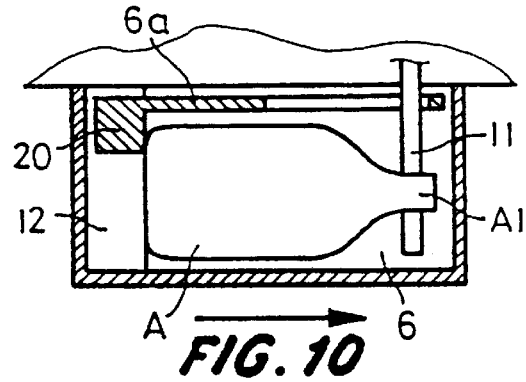
Figure 11:
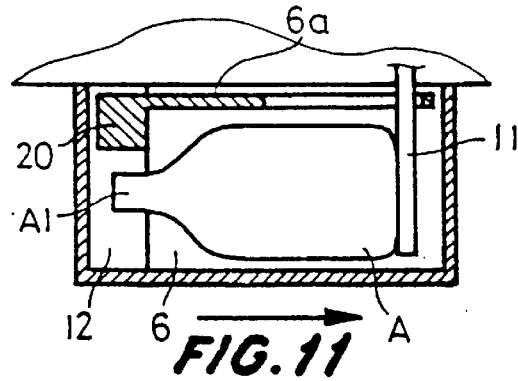
Figure 12:
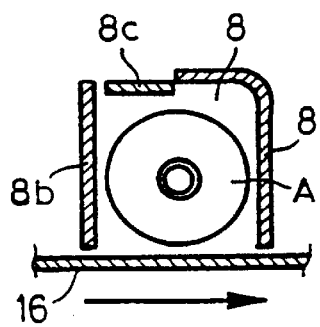
Figure 13:
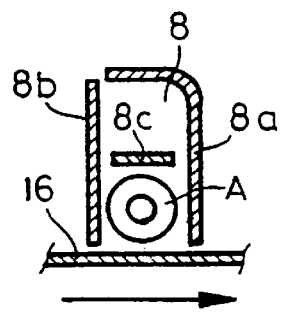
Figure 14:
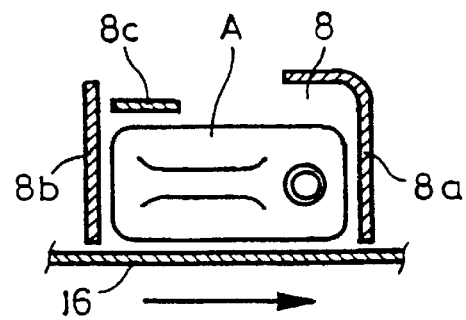

FIGS. 8 to 11 are longitudinal sections in plan-view of a compartment illustrating two exemplary adaptations both in the transversal and the longitudinal directions of said compartment to two different types of container, in the two possible positions of the container inside the compartment; and FIGS. 12 to 14 are cross-sections illustrating a discharge chute in three exemplary dimensional adaptations to three different types of container.

Firstly referring to FIGS. 1 and 2 at numeral 6 is indicated a compartment for a container A, said compartment being integral with the periphery of an upper portion of a first rotary, circular structure 7. It shall be noted that in reality there is a plurality of adjacent compartments 6 arranged all along the periphery of structure 7, although for better clarity only one of them has been represented in the drawing. In said FIG. 1 an arrow indicates the sense of the rotational motion of structure 7. Each compartment 6 is situated above a discharge chute 8 leaving a spacing between them, said discharge chute being of essentially rectangular cross-section tapering from top to bottom, and being formed by a leading wall 8a, a trailing wall 8b and a lateral wall leaving an open side that is delimited by a stationary wall 16 of an enveloping shell. Said discharge chute travels along with the corresponding compartment 6 whose bottom is open and is arranged directly above a supporting stationary floor 9 of annular configuration provided with a gap 10 provided to allow a container A to pass by gravity from the inside of a compartment 6 to the inside of a discharge chute 8. In this exemplary embodiment a lateral wall of compartment 6 and the lateral wall of discharge chute 8 are both jointly formed by one only part 17 of bent sheet which is apt to be transversally shifted and is supported, guided and actuated at its upper and lower ends by means of fluid-operated actuation units 21 integral with the first structure 7. Said part 17 forms a recessed fold 17b in correspondence with stationary floor 9 in order not to interfere with said floor 9 when being transversally shifted.

Within compartment 6 and in a leading area of the same there is an elongated member 11 such as a transversal bar or rod provided to form a leading support for the neck A1 of container A, said member 11 extending through an oblong hole 17a of part 17, whereas an arrangement 12 for trailingly supporting the neck A1 of said container A is fixed to the trailing wall of said compartment. Integral with the trailing area of that portion of part 17 that is situated within compartment 6 is to be found a stop arrangement 20 for the base or bottom A2 of container A to prevent it from coming to rest on support 12. Elongated member 11 is apt to be shifted both in the transversal and longitudinal directions within compartment 6 in order to adapt it to containers of different lengths. For the adjustment of the longitudinal shift all and each of the elongated members 11 are associated to a second structure 14 that travels along with the first structure 7, the relative longitudinal position of the second structure 14 with respect to the first structure 7 being adjustable thus providing an identical longitudinal positioning of the elongated member 11 in a joint and simultaneous manner in all compartments 6. On the other hand, for the adjustment of the transversal shift all and each of the elongated members 11 are mounted in a radially sliding arrangement in bearings 23 of the second structure 14 (see FIG. 5) and provided with springs 26 that keep them with their inner ends in abutment against cams 24 arranged on the periphery of a disk 25 provided to turn concentrically with respect to the second structure 14, and to be fixed on this latter in a desired position thus providing an identical transversal positioning of the elongated members 11 in a joint and simultaneous manner in all of the compartments 6.

All and each of the leading walls 8a of the discharge chutes 8 are on their side connected to a third structure 19 that travels along with said first structure 7, the relative longitudinal position of the third structure 19 with respect to the first structure 7 being adjustable thus providing an identical positioning of the walls 8a in a joint and simultaneous manner in all of the discharge chutes 8.

In an exemplary embodiment featuring an alternative arrangement of the instant invention there is no supporting stationary floor 9, but each compartment 6 has a supporting floor 27 linked at its inner side in a hinged connection to said compartment 6, said supporting floor 27 being provided with an appendage to which is fitted a wheel 28 running on a stationary track 29 thereby keeping said supporting floor 27 in its closed position (FIG. 3). Track 29 has a gap in a portion of the path thus causing wheel 28 to loose its support thereby allowing supporting floor 27 to open by gravity thus dropping container A into discharge chute 8 (FIG. 4).

In an alternative embodiment (not shown), regardless of whether the floor provided is of the type of the supporting stationary floor 9 or of the type of the hinged supporting floor 27 each compartment 6 has an adjustable, shiftable lateral wall 6a and an elongated member 11 for leadingly supporting the neck A1 of container A, said member also being shiftable and adjustable in a way similar to the way described above, whereas each discharge chute 8 associated to each compartment 6 is a one-piece member that is easily removable, this arrangement hence combining the existence of adjustable compartments with that of replaceable discharge chutes.

Figure 6:
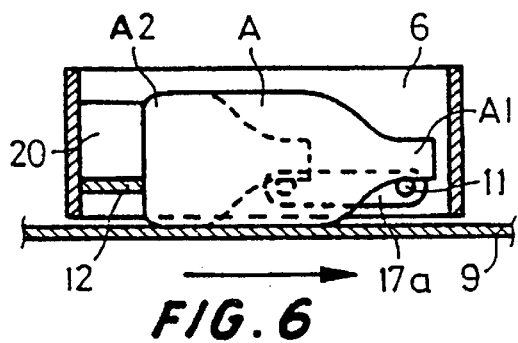
FIGS. 6 and 7 are longitudinal sections in an elevational view of a compartment illustrating its longitudinal adaptation to containers of different heights and showing the two possible positions of the container inside the compartment.
Figure 7:
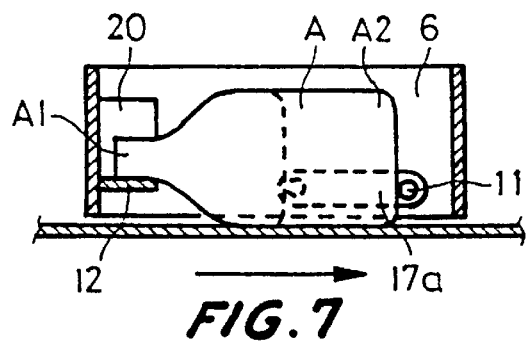

FIGS. 6 and 7 show in a sectional view a compartment 6 traveling in the direction of the arrows above the supporting annular stationary floor 9. Within said compartment 6 and adjacent to the trailing wall there is the arrangement 12 for trailingly supporting the neck A1 of container A, and the stop arrangement 20 for the base A2 of said container. On the leading side of compartment 6 is arranged through the oblong hole 17a the elongated member 11 for leadingly supporting the neck A1 of container A. With solid line is illustrated a container of the maximum allowable length, with the elongated member 11 in its longest spacing position. With dashed line is shown a container of the shortest allowable length, with the elongated member 11 in its shortest spacing position. Both in one and in the other case it can be observed that when container A has come to be situated with its neck A1 pointing in the traveling direction indicated by the arrow in FIG. 6 the stop arrangement 20 prevents the base A2 of the container A from coming to rest on the trailingly supporting arrangement 12, in such a way that the neck A1 is situated on the elongated member 11, this latter having been duly positioned as per the length of the container A, whereas the body of the container A is slidingly resting on the supporting stationary floor 9. If the container A has come to be situated with its bottom adjacent to the leading side of the compartment with respect to the traveling direction indicated by the arrow (FIG. 7) said neck A1 comes to rest on the trailingly supporting arrangement since it does not interfere with the stop arrangement 20 due to the smaller thickness of the latter, in such a way that the base A2 of container A comes to be situated behind the elongated member 11, and the body of container A is slidingly resting on the supporting stationary floor 9. As can be appreciated, in all cases when arriving at gap 10 of the supporting stationary floor 9 container A would start falling with its base A2 first since the neck A1 would be always supported.

Figure 8:
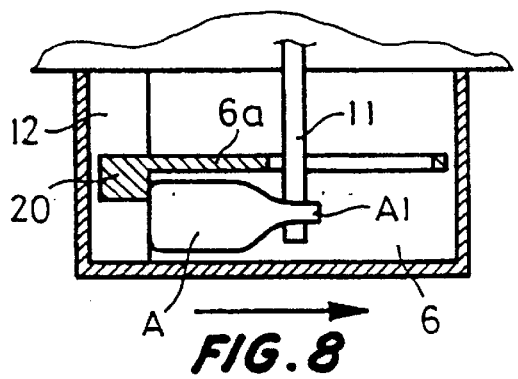
Figure 9:
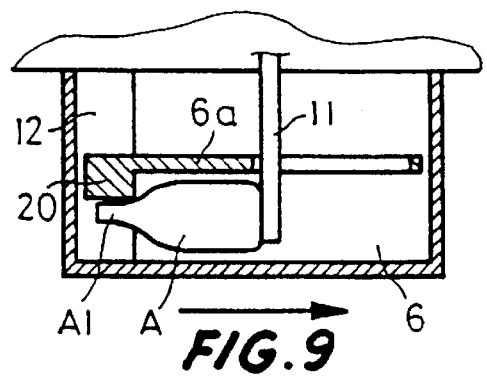

The next following FIGS. 8 and 9 show in a sectional plan-view a compartment 6 provided with the supporting elongated member 11 situated in the shortest distance position, and with a shiftable lateral wall 6a situated in a smallest width position, containing an exemplary container of the smallest size allowed by compartment 6. FIGS. 10 and 11 show the same compartment of FIGS. 8 and 9, but with the supporting elongated member 11 situated in a longest distance position, and with the shiftable lateral wall 6a situated in a biggest width position so as to adapt to a container A of the biggest allowable size. In FIGS. 8 and 10 the containers A are situated with the neck A1 facing the leading side with respect to the traveling direction indicated by the arrows, whereas in FIGS. 9 and 11 the containers A are situated with the neck A1 oriented in the opposite direction with respect to the traveling direction indicated by the arrows. It is obvious that between the maximum length and width positions and the minimum length and width positions countless different combinations can be used in order to adapt the compartment to a wide variety of different types of container.

FIGS. 12 to 14 finally show a discharge chute 8 in cross-sectional view formed by a leading wall 8a, a trailing wall 8b and a lateral wall 8c, the open side being delimited by the stationary wall 16 of a shell. Said FIGS. 12 to 14 show the three different exemplary arrangements that can be adopted by said discharge chute 8 in order to adapt to three different types of container. In said arrangements the trailing wall 8b is fixed to the first structure 7 carrying the compartments 6; the lateral wall 8c is as well connected to said first structure 7 but is apt to be transversally shifted, for such a purpose being supported, guided and actuated by fluid-operated actuation units 21; and the leading wall 8a is connected to a third structure 19 that travels along with said first structure 7, the relative longitudinal position of the second structure 19 with respect to the first structure 7 being adjustable, so that by combining said adjustments countless arrangements can be obtained for the adaptation of the discharge chute 8 to different types of containers.

Although mechanical actuation units are preferred for the relative adjustment and positioning between the different shiftable structures, it is also feasible to obtain said adjustment by means of a manual actuation, blocking and unblocking means having been provided on said structures.

What is claimed is:

1. An adjustable unit for the unscrambling and lined up delivery of empty lightweight containers comprising:

a receptacle (1) adapted to receive in bulk said containers (A), said receptacle having a bottom (2) on which said containers (A) accumulate, said bottom (2) having a peripheral portion (3) spaced from a lateral wall (4) of said receptacle thus defining a gap (5) through which the containers (A) can pass;

a plurality of adjacent compartments (6) arranged in vicinity of said peripheral portion (3) and connected to a first structure (7) so that said compartments travel along a closed circuit, each compartment (6) adapted to receive one only container (A) in a lying position and oriented with an open end (A1) adjacent to a leading or trailing side, with respect to a direction of said traveling, each of said compartments having an open bottom delimited by arrangements (11 and 12) for supporting the open end (A1) of the container (A) said trailing side having a stop arrangement for the bottom of said container (A);

a plurality of discharge chutes (8) associated with said first structure (7), each discharge chute (8) arranged below each of said compartments (6) to receive said containers (A) being oriented in an upright position as they fall, and said chutes transferring said containers (A) in an upright position and in a lined up arrangement onto a downstream equipment; and a supporting stationary floor (9) interposed between said open bottom of said compartments (6) and said discharge chutes (8), said stationary floor being provided with a gap (10) providing a fall of said containers (A);

wherein each arrangement for supporting said open end (A1) of each container (A) adjacent to said leading side of each compartment (6) is formed by an elongated member (11) to be shifted within the compartment in order to accommodate for container size wherein all of the elongated members (11) are connected to a second structure (14) that is adjustable with respect to said first structure (7) so that all of the compartments (6) are adjusted simultaneously.

2. A unit as per claim 1, wherein said closed circuit describes a circumferential path and said first structure (7) consists of a rotary, circular arrangement with the compartments (6) and discharge chutes (8) spaced along thereof, both said first and second structures (7, 14) being adjustable through an angular displacement, and said shift of said elongated members (11) being longitudinal to the compartments (6).

3. A unit as per claim 2, wherein each of said elongated members (11) is adjustable in extension transversally to each compartment (6).

4. A unit as per claim 3, wherein all of said elongated members (11) transversally adjustable in extension are adjustable in a joint and simultaneous manner in one only operation by means of an arrangement of pusher cams (24, 25).

5. A unit as per claim 1, wherein a lateral wall (6a) of each of the compartments (6) is shiftable so that the relative position of said lateral wall (6a) with respect to an opposite wall of each compartment is adjustable thus providing an adaptation of a width of compartment (6) to a width of said container (A).

6. A unit as per claim 5, wherein all of said lateral walls (6a) of the compartments (6) are adjustable with respect to the opposite walls thereof jointly and simultaneously in one only operation through pusher means having a cam system.

7. A unit as per claim 1, wherein each discharge chute (8) is of a cross-section that tapers from top to bottom, and is formed by a leading wall (8a), a trailing wall (8b) and an inner, lateral wall (8c) leaving an open side delimited by a stationary wall (16) of an enveloping shell of the unit, the relative position of the inner, lateral wall (8c) with respect to said stationary wall (16) being adjustable to thus adapt a width of said discharge chute (8) to a width of the container (A).

8. A unit as per claim 7, wherein the relative position of all of the inner, lateral walls (8c) with respect to the stationary wall (16) are jointly and simultaneously adjustable in one only operation through pusher means having a cam system.

9. A unit as per claim 1, wherein a lateral wall (6a) of each compartment (6) and an inner, lateral wall (8c) of each corresponding discharge chute (8) are both jointly formed by one only shiftable part (17) whose relative position with respect to an opposite wall is adjustable for adapting a width of said compartment (6) and said discharge chute (8) to a size of the container (A).

10. A unit as per claim 9, wherein the relative position of all of the parts (17) with respect to the opposite walls is jointly and simultaneously adjusted in one only operation through pusher means having a cam system.

11. A unit as per claim 7, wherein said leading wall (8a) of each discharge chute (8) is shiftable, so that a relative position of the leading wall (8a) with respect to the trailing wall (8b) is adjustable to thus adapt the width of said discharge chute (8) to the width of the container (A).

12. A unit as per claim 11, wherein all of the leading walls (8a) are connected to a third structure (19), said structure 19 being adjustable with respect to said structure (7), thus providing an identical positioning of said leading walls (8a) simultaneously in all of said discharge chutes (8).

13. A unit as per any of claims 1 to 12, wherein all of the above-mentioned simultaneous adjustments are carried out by manual actuation means to unblock, shift and again block structures (14, 19) with respect to said first structure (7).

14. A unit as per any of claims 1 to 12, wherein said unit includes mechanical means to carry out all of the above-mentioned simultaneous adjustment shiftings.

15. A unit as per any of claims 1 to 6, wherein said unit includes removable and interchangeable discharge chutes (8).

16. An adjustable unit for the unscrambling and lined up delivery of empty containers (A), of the type comprising:

- a receptacle (1) to receive in bulk said containers (A) having a bottom (2) on which said containers (A) accumulate, said bottom (2) having a peripheral portion (3) spaced from a lateral wall (4) of said receptacle thus defining a gap (5) through which the containers (A) can pass;
- a plurality of adjacent compartments (6) arranged in vicinity of said peripheral portion (3) and connected to a first structure (7) so that said compartments travel along a closed circuit, each compartment (6) adapted to receive one only container (A) in a lying position and oriented with an open end (A1) adjacent to a leading or trailing side, with respect to a direction of said traveling, each of said compartments having an open bottom delimited by arrangements (11 and 12) for supporting an open end (A1) of one of the containers (A) said trailing side having a stop arrangement for the bottom of said one container (A);
- a plurality of discharge chutes (8) associated with said first structure (7), each discharge chute (8) arranged below each of said compartments (6) to receive said containers (A) being oriented in an upright position as they fall, and said chutes transferring said containers (A) in an upright position and in a lined up arrangement onto a downstream equipment; and
- a supporting floor (27) that is connected to each compartment (6) and is provided to close said open bottom thus supporting a container (A) and to selectively open to thus drop said container (A) into a corresponding discharge chute (8);
- wherein each arrangement for supporting said open end (A1) of each container (A) adjacent to said leading side of each compartment (6) is formed by an elongated member (11) to be shifted within the compartment in order to accommodate for container size where all of the elongated members (11) are connected to a second structure (14) that is adjustable with respect to said first structure (7) so that all of the compartments (6) are adjusted simultaneously.

17. A unit as per claim 16, wherein said closed circuit describes a circumferential path and said first structure (7) consists of a rotary, circular arrangement with the compartments (6) and discharge chutes (8) spaced along thereof, both said first and second structures (7, 14) being adjustable through an angular displacement, and said shift of said elongated members (11) being longitudinal to the compartments (6).

18. A unit as per claim 17, wherein each of said elongated members (11) is adjustable in extension transversally to each compartment (6) and wherein all of said elongated members (11) transversally adjustable in extension are adjustable in a joint and simultaneous manner in one only operation by means of an arrangement of pusher cams (24, 25).

19. A unit as per claim 16, wherein a lateral wall (6a) of each of the compartments (6) is shiftable so that the relative position of said lateral wall (6a) with respect to an opposite wall of each compartment is adjustable thus providing an adaptation of a width of compartment (6) to a width of said container (A) and wherein all of said lateral walls (6a) of the compartments (6) are adjustable with respect to opposite walls thereof jointly and simultaneously in one only operation through pusher means having a cam system.

20. A unit as per claim 16, wherein each discharge chute (8) is of a cross-section that tapers from top to bottom, and is formed by a leading wall (8a), a trailing wall (8b) and an inner, lateral wall (8c) leaving an open side delimited by a stationary wall (16) of an enveloping shell of the unit, the relative position of the inner, lateral wall (8c) with respect to said stationary wall (16) being adjustable to thus adapt a width of said discharge chute (8) to a width of the container (A), and wherein the relative position of all of the inner, lateral walls (8c) with respect to the stationary wall (16) are jointly and simultaneously adjustable in one only operation through pusher means having a cam system.

21. A unit as per claim 20, wherein said leading wall (8a) of each discharge chute (8) is shiftable, so that a relative position of the leading wall (8a) with respect to the trailing wall (8b) is adjustable to thus adapt the width of said discharge chute (8) to the width of the container (A) and wherein all of the leading walls (8a) are connected to a third structure (19) which is adjustable with respect to said first structure (7), thus providing an identical positioning of said leading walls (8a) simultaneously in all of said discharge chutes (8).

22. A unit as per any of claims 16 to 21, wherein all of the above-mentioned simultaneous adjustments are carried out by manual actuation means to unblock, shift and again block structures (14, 19) with respect to the first structure (7).

23. A unit as per any of claims 16 to 21, wherein the unit includes mechanical means to carry out all of the above-mentioned simultaneous adjustment shiftings.

24. A unit as per any of claims 16 to 19, wherein the unit includes removable and interchangeable discharge chutes (8).

* * * * *